C. E. ANDERSON.
COVER PLATE FOR FLUSH RECEPTACLES.
APPLICATION FILED MAY 2, 1916.
1,230,643. Patented June 19, 1917.
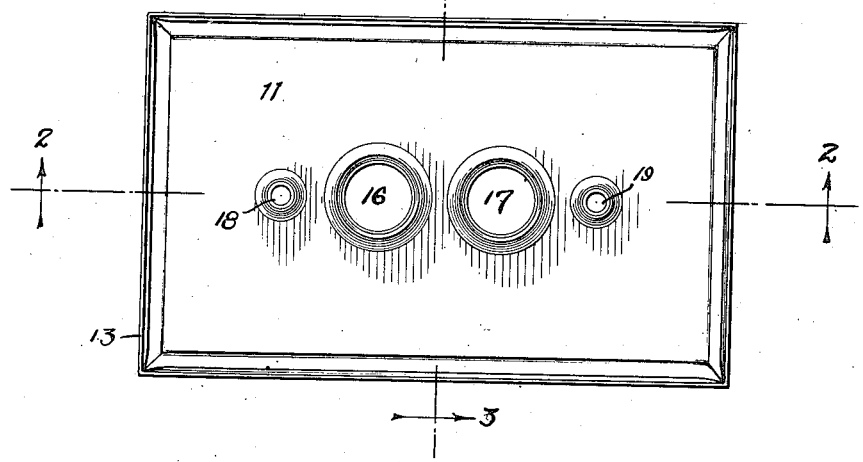
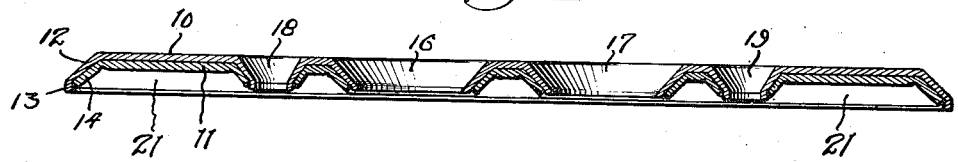
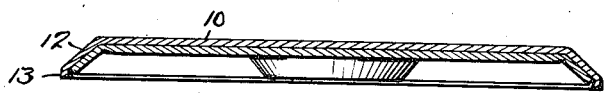
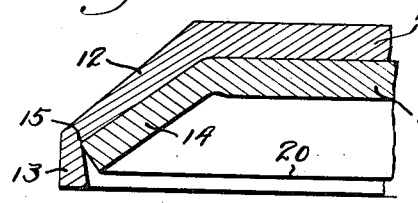
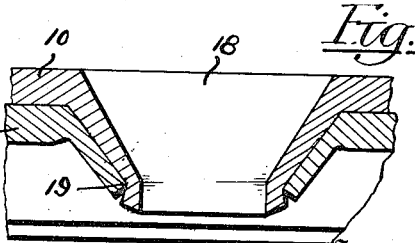
Witness:-
Titus H. Irons
Inventor
CARL ERIC ANDERSON
By his Attorneys

UNITED STATES PATENT OFFICE.

CARL ERIC ANDERSON, OF BRIDGEPORT, CONNECTICUT, ASSIGNOR TO THE BRYANT ELECTRIC COMPANY, OF BRIDGEPORT, CONNECTICUT, A CORPORATION OF CONNECTICUT.

COVER-PLATE FOR FLUSH RECEPTACLES.

1,230,643.  Specification of Letters Patent.  Patented June 19, 1917.

Application filed May 2, 1916. Serial No. 95,009.

*To all whom it may concern:*

Be it known that I, CARL ERIC ANDERSON, a citizen of the United States of America, and residing at Bridgeport, in the county of Fairfield and State of Connecticut, have invented a certain new and useful Improvement in Cover-Plates for Flush Receptacles of which the following is a specification.

My invention relates to cover plates for flush receptacles, and the object of my invention is to provide a cheap and inexpensive yet efficient device of this character.

In the accompanying drawings,

Figure 1 is an inverted plan of a face plate in which my invention is embodied;

Fig. 2 is a longitudinal section therethrough on the line 2—2, Fig. 1, but drawn to a larger scale;

Fig. 3 is a cross section on the line 3—3, Fig. 1, drawn to the scale of Fig. 2; and Figs. 4 and 5 are partial sections through the plate drawn to a greatly enlarged scale in order to show the construction.

The present face plate comprises a thin sheet metal facing plate 10 of relatively expensive material, such as brass, combined with a lining plate 11 of relatively inexpensive material such as sheet steel. The union between the parts is accomplished by a slight flow or displacement of the relatively soft metal, viz., brass, of the facing plate under the action of very heavy pressure in a die while in contact with the relatively hard and indeformable lining plate of steel. In the manufacture of the present article the blank for the facing plate 10 and that for the lining plate 11 are superposed in a suitably shaped die and subjected to extremely heavy pressure from the coöperating plunger of the die. The margins of the facing plate 10 are shaped by the die to a bevel 12 which terminates in a marginal edge 13 lying at right angles to the outer surface of the plate 10. The lining plate 11, which is of slightly smaller area, is acted upon by portion of the dies forming the bevel 12 so that a corresponding bevel 14 is imparted thereto, but no edge such as 13. The result of this operation is that the angle 15 of the lining plate forms a sharp corner which, by reason of its greater hardness, digs into the metal of the facing plate 10 at the angle between the bevel 12 and margin 13 as best indicated in Fig. 4. This affords an engagement between the parts which is very firm and prevents their separation under normal conditions.

This marginal engagement is supplemented by a similar engagement between the facing and lining plates at the apertures 16 and 17 through which project the buttons of a push switch or the jacks of an attachment plug and also by the engagement between the plates at the apertures 18 and 19 for the usual countersunk screws by which the face plate is mounted upon its receptacle. One of these apertures, viz. 18, is shown in Fig. 5. It will be noted that the corner 19 of the lining plate digs into the metal of the facing plate in substantially the same manner as at the margin of the plate.

A further feature which may be pointed out and which is a result of the slightly smaller area of the lining plate is the fact that the margin 13 of the facing plate extends below the lower edge 20 of the lining plate so that the lining plate is completely concealed when the face plate is installed. A further feature of advantage resides in the fact that no additional securing means are required to hold the reinforcing lining in position and which would serve to mar the appearance of the face plate.

By the construction shown it is possible to use a very thin, sheet-metal, brass facing plate 10, while at the same time securing the finish which is ordinarily attained only by the use of a heavier face plate of brass which must be milled and ground and otherwise finished to produce the beveled margins and apertures and the recesses 21 for the securing lugs of the fitting (not shown), all of which are now accomplished by the same operation which secures the union between the facing and lining plates.

The particular form of the face plate may be varied as well as the apertures therein for different types of receptacles, without departing from what I claim as my invention.

I claim as my invention:—

1. A face plate comprising a thin sheet of relatively soft metal forming a facing plate and a lining plate of relatively strong sheet metal therefor, both facing and lining plates being beveled at their margins and united by the entry of the edge of the lining plate into the metal of the facing plate under the displacing heavy pressure of a die, 2. A face plate comprising a thin sheet of relatively soft metal forming a facing plate and a lining plate of relatively strong sheet metal therefor, both facing and lining plates being beveled at their margins and united by the entry of the edge of the lining plate into the metal of the facing plate under the displacing heavy pressure of a die, said facing and lining plates being apertured in register and said apertures beveled and having a like engagement between the margins of the lining plate and the bevels of the facing plate at said apertures.

3. A face plate comprising a thin sheet of relatively soft sheet metal forming a facing plate and a lining plate therefor of relatively hard sheet metal, both facing and lining plates being beveled at their margins and the facing plate having an edge which extends beyond the bevel of the lining plate, and having a shouldered engagement with the latter incident to the penetration of the inner face of the relatively soft facing plate by the edge of the relatively hard lining plate, whereby said facing and lining plates are united.

4. A face plate comprising a thin sheet of relatively soft sheet metal forming a facing plate and a lining plate therefor of relatively hard sheet metal, both facing and lining plates being beveled at their margins and the facing plate having an edge lying substantially at right angles to the face of the plate and extending beyond the bevel of the lining plate, the edge of said lining plate penetrating the inner face of the facing plate at the angle between the edge of the latter and its beveled portion and thereby affording a shouldered engagement between the plates serving to unite the same substantially as described.

In testimony whereof I have signed my name to this specification, in the presence of two subscribing witnesses.

CARL ERIC ANDERSON.

Witnesses:
    GEORGE B. THOMAS,
    G. W. GOODRIDGE.